(12) United States Patent
Chen et al.

(10) Patent No.: US 6,781,146 B2
(45) Date of Patent: *Aug. 24, 2004

(54) ANNEALED TUNNELING EMITTER

(75) Inventors: Zhizhang Chen, Corvallis, OR (US); Michael J. Regan, Corvallis, OR (US); Brian E Bolf, Albany, OR (US); Thomas Novet, Corvallis, OR (US); Paul J. Benning, Lexington, MA (US); Mark Alan Johnstone, Lebanon, OR (US); Sriram Ramamoorthi, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 85 days.

This patent is subject to a terminal disclaimer.

(21) Appl. No.: 09/846,127

(22) Filed: Apr. 30, 2001

(65) Prior Publication Data

US 2002/0167001 A1 Nov. 14, 2002

(51) Int. Cl.[7] .......................... H01L 29/06; H01L 29/12; H01L 29/74
(52) U.S. Cl. .............................. 257/10; 257/11; 257/163
(58) Field of Search ................................ 257/9–11, 163, 257/25; 313/309

(56) References Cited

U.S. PATENT DOCUMENTS

| | | | |
|---|---|---|---|
| 4,303,930 A | | 12/1981 | Van Gorkom et al. ........ 357/13 |
| 4,516,146 A | | 5/1985 | Shannon et al. .............. 357/52 |
| 5,090,932 A | | 2/1992 | Dieumegard et al. ......... 445/24 |
| 5,414,272 A | | 5/1995 | Watanabe et al. ............. 257/10 |
| 5,473,218 A | * | 12/1995 | Moyer ......................... 313/309 |
| 5,554,859 A | | 9/1996 | Tsukamoto et al. ........... 257/10 |
| 5,557,596 A | * | 9/1996 | Gibson et al. ............... 369/101 |
| 5,559,342 A | | 9/1996 | Tsukamoto et al. ........... 257/10 |
| 5,702,281 A | * | 12/1997 | Huang et al. ................. 445/50 |
| 5,703,380 A | * | 12/1997 | Potter .......................... 257/10 |
| 5,760,417 A | | 6/1998 | Watanabe et al. ............. 257/11 |
| 5,814,832 A | | 9/1998 | Takeda et al. ................ 257/10 |
| 5,825,049 A | * | 10/1998 | Simmons et al. ............. 257/25 |
| 5,982,091 A | | 11/1999 | Konishi ...................... 313/495 |
| 6,008,576 A | * | 12/1999 | Nakatani et al. ............ 313/495 |
| 6,011,356 A | | 1/2000 | Janning et al. .......... 315/169.4 |
| 6,023,124 A | * | 2/2000 | Chuman et al. ............ 313/310 |

(List continued on next page.)

FOREIGN PATENT DOCUMENTS

| | | |
|---|---|---|
| EP | 0989577 | 3/2000 |
| EP | 1003195 | 5/2000 |
| EP | 1094485 | 4/2001 |
| JP | 2001118489 | 4/2001 |
| JP | 2001118500 | 4/2001 |

OTHER PUBLICATIONS

Kusonki, T., et al. "Increasing Emission Current From MIM Cathodes by Using IR–PE–AU Multilayer top Electrode," IEE Transaction on Electron Devices, vol. 47, No. 8, Aug. 2000, pp. 1667–1672.
Eastman, P.C., et al. "Injection Electroluminescence in Metal–Semiconductor Tunel Diodes," Solid State Electronics, Pergamon Press 1964, vol. 7, pp. 879–885.

*Primary Examiner*—Mary Wilczewski
*Assistant Examiner*—Monica Lewis
(74) *Attorney, Agent, or Firm*—Timothy F. Myers

(57) ABSTRACT

An emitter has an electron supply layer and a tunneling layer formed on the electron supply layer. Optionally, an insulator layer is formed on the electron supply layer and has openings defined within which the tunneling layer is formed. A cathode layer is formed on the tunneling layer to provide a surface for energy emissions of electrons and/or photons. Preferably, the emitter is subjected to an annealing process thereby increasing the supply of electrons tunneled from the electron supply layer to the cathode layer.

37 Claims, 12 Drawing Sheets

U.S. PATENT DOCUMENTS

| | | | | |
|---|---|---|---|---|
| 6,034,479 A | * | 3/2000 | Xia | 313/169.1 |
| 6,096,570 A | | 8/2000 | Hattori | 438/20 |
| 6,107,732 A | | 8/2000 | Tolt | 313/495 |
| 6,118,136 A | * | 9/2000 | Liu et al. | 257/17 |
| 6,130,503 A | * | 10/2000 | Negishi et al. | 313/495 |
| 6,137,212 A | | 10/2000 | Liu et al. | 313/308 |
| 6,328,620 B1 | * | 12/2001 | Hu | 445/50 |
| 2002/0024808 A1 | * | 2/2002 | Suehiro et al. | 362/245 |
| 2002/0167021 A1 | * | 11/2002 | Chen et al. | 257/163 |

\* cited by examiner

ANNEALED TUNNELING EMITTER

FIELD OF THE INVENTION

The invention is directed to field emission devices. In particular the invention is directed to the flat field emission emitters utilizing direct tunneling and their use in electronic devices.

BACKGROUND OF THE INVENTION

Several different field emission devices have been proposed and implemented to create electron emissions useful for displays or other electronic devices such as storage devices. Traditionally, vacuum devices with thermionic emission such as electron tubes required the heating of cathode surfaces to create the electron emission. The electrons are drawn in a vacuum space to an anode structure that is at a predetermined voltage potential to attract the electrons. For a display device such as a cathode ray tube, the anode structure is coated with phosphors such that when an electron impinges on the phosphor, photons are generated to create a visible image. Cold cathode devices such as spindt tips (pointed tips) have been used to replace the hot cathode technology. However, it has been difficult to reduce the size and integrate several spindt tips while maintaining reliability. As the size is reduced, the spindt tip becomes more susceptible to damage from contaminants in the vacuum that are ionized when an electron strikes it. The ionized contaminant is then attracted to the spindt tip and collides with it, thereby causing damage. To increase the life of the spindt tip, the vacuum space must have an increasingly high vacuum. A flat emitter having a larger emission surface can be operated reliably at lower vacuum requirements. However, for some applications, the amount of current density from conventional flat emitters is not high enough to be useful. Thus a need exists to create a flat emitter that has high current density that is also able to operate reliably in low vacuum environments.

SUMMARY

An emitter has an electron supply layer and a tunneling layer formed on the electron supply layer. Optionally, an insulator layer is formed on the electron supply layer and has openings defined within in which the tunneling layer is formed. A cathode layer is formed on the tunneling layer to provide a surface for energy emissions of electrons and/or photons. Preferably, the emitter is subjected to an annealing process thereby increasing the supply of electrons tunneled from the electron supply layer to the cathode layer.

DETAILED DESCRIPTION OF THE PREFERRED AND ALTERNATE EMBODIMENTS

Figure 1:
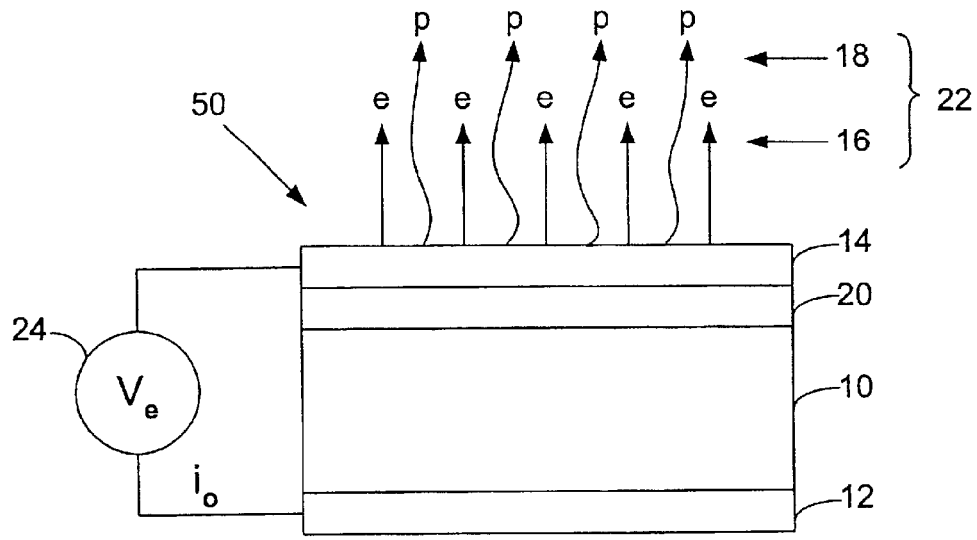
FIG. 1 is an exemplary illustration of a tunneling emitter incorporating the invention.

The present invention is directed to field emission emitters that provide high levels of emission current per square centimeter by using a tunneling layer that has a sufficient thinness of less than about 500 Angstroms to create a high electric field between an electron source and a flat cathode surface. Conventional flat emitter type devices have low emission current per square centimeter of surface area and thus are not usable in several applications. The invention uses a thin deposition of a metal cluster dielectric, preferably between 50 and 250 Angstroms, preferably about 100 Angstroms to create a barrier in which electrons can tunnel between the electron source and the cathode surface. By using such a material, the emission current can be greater than 10 mAmps, 100 mAmps, or 1 Amp per square centimeter which is one, two, or three orders of magnitude, respectively, greater than that of conventional flat emitter technology. The actual emission rate will depend upon the design choices of the type and thickness of material used for the tunneling layer. In addition to electron emissions, the invention is also able to create photon emissions that provides for additional uses for the emitter incorporating the invention. Further advantages and features of the invention will become more apparent in the following description of the invention, its method of making and various applications of use.

In the illustrations of this description, various parts of the emitter elements have not been drawn to scale. Certain dimensions have been exaggerated in relation to other dimensions in order to provide a clearer illustration and understanding of the present invention. For the purposes of illustration, the embodiments illustrated herein are shown in two-dimensional views with various regions having depth and width. It should be understood that these region are illustrations only of a portion of a single cell of a device, which may include a plurality of such cells arranged in a three-dimensional structure. Accordingly, these regions will have three dimensions, including length, width, and depth when fabricated on an actual device.

Further, one aspect of the invention is that it can be fabricated using conventional integrated circuit thin-film technologies. Several different technologies exist to perform several of the process steps and can be interchanged by those having skill in the art. For example, unless specifically called out, deposition of material can be by one of several processes such as evaporation, sputtering, chemical vapor deposition, molecular beam epitaxy, photochemical vapor deposition, low temperature photochemical vapor deposition, and plasma deposition, to name a few. Additionally, several different etch technologies exist such as wet etching, dry etching, ion beam etching, reactive ion etching, and plasma etching such as barrel plasma etching and planar plasma etching to name some of the possible etching technologies. Choice of actual technologies used will depend on material used and cost criteria among other factors.

FIG. 1 is an exemplary diagram of an emitter device 50, preferably a flat emitter for electron and photon emission, which includes an electron source 10. On the electron source is a tunneling layer 20. Preferably, the tunneling layer 20 is formed from a metal cluster dielectric such as tungsten silicon nitrate (WSiN) or tantalum oxide (TaO$_x$), titanium oxide (TiO$_x$, where x=0.5 to 2.5). Also, tantalum aluminum oxynitride (TaAlO$_x$,N$_y$), tantalum aluminum oxide (TaAlO$_x$), aluminum oxynitride (AlO$_x$N$_y$) or other transitionary metal (TM) oxides or oxynitrides ((TM)O$_x$, or (TM)O$_x$N$_y$) are envisioned as being capable of use as tunneling layer 20. The tunneling layer preferably has a thickness less than 500 Angstroms and preferably the thickness is within the range of about 50 to about 250 Angstroms, such as 100 Angstroms or less. The chosen thickness determines the electrical field strength that the tunneling layer must be able to withstand and the desired emitter emission current. Disposed on the tunneling layer 20 is a cathode layer 14, preferably a thin-film conductor such as platinum, gold, molybdenum, iridium, ruthenium, tantalum, chromium, or other refractive metals or alloys thereof. Preferably, the thickness of the cathode layer is 30 to 150 Angstroms. When a voltage source 24 having an emitter voltage V$_e$(about 3–10V) is applied to the cathode layer 14 and electron supply 10 via a contact 12, electrons tunnel from the substrate 10 (an electron supply) to the cathode layer 14. Because of the thinness of the tunneling layer 20, the electric field in which the electrons tunnel through is very strong and the electron emission 16 from the surface of the cathode layer 14 is greater than conventional designs. Also, photon emission 18 occurs along with the electron emission 16 to form the energy emission 22 from the emitter 50.

The electron field is calculated for various thicknesses as $$\vec{E} = \frac{V_e}{t_{thickness}}$$

where t$_{thickness}$ is the thickness of tunneling layer 20. For example, for a V$_e$=10V, the electric field is equal to 10$^7$ volts/meter for a 100 Angstrom thickness in the tunneling layer.

Preferably, the tunneling layer 20 is sputter deposited. By using metal cluster dielectrics as the tunneling layer, a very high electric field strength can be applied between the electron source 10 and the cathode layer 14 to achieve higher emission, because the metal cluster dielectrics withstand much higher electrical field strength without electrical breakdown.

Figure 2:
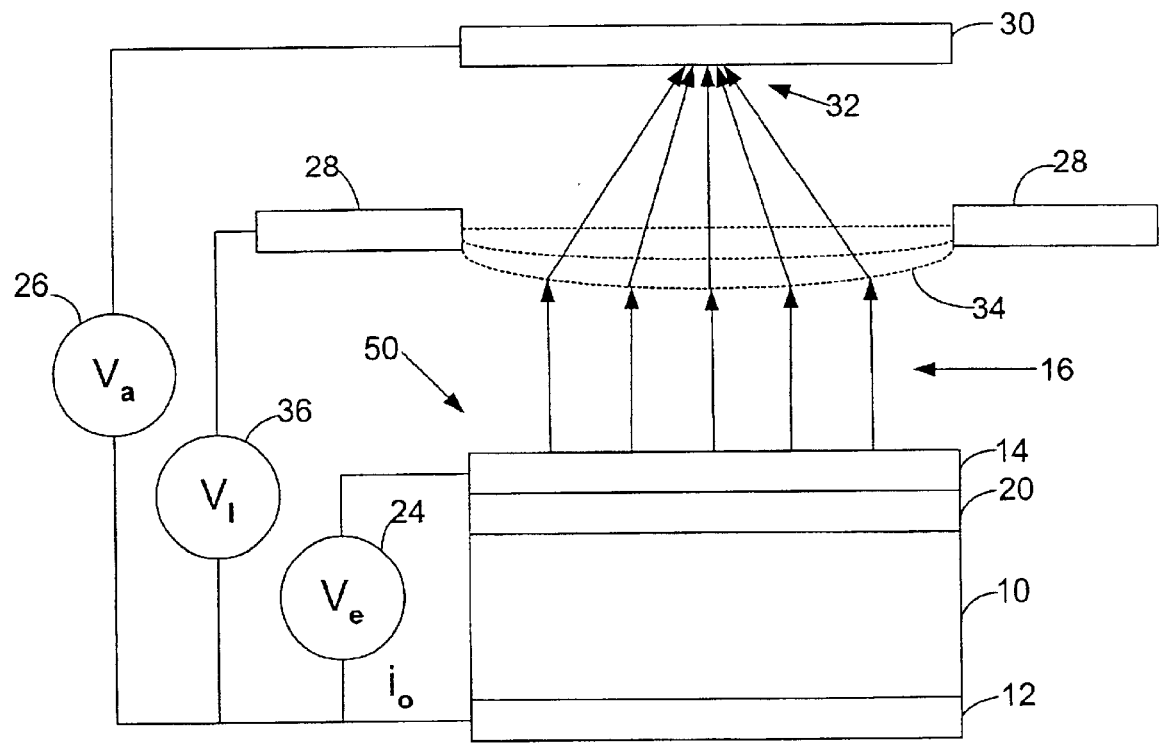
FIG. 2 is an exemplary illustration of the use of the tunneling emitter of FIG. 1 to create a focused electron beam.

FIG. 2 is an exemplary diagram of a use for the emitter 50 of FIG. 1. In this application, the electron emission 16 is focused by an electrostatic focusing device or lens 28, exemplified as an aperture in a conductor that is set at predetermined voltage 36 that can be adjusted to change the focusing effect of the lens 28. Those skilled in the art will appreciate that lens 28 can be made from more than one conductor layer to create a desired focusing effect. The electron emission 16 is focused by lens 28 into a focused beam 32 onto an anode structure 30. The anode structure 30 is set at an anode voltage V$_a$ 26 which magnitude vanes for an application depending on the intended use and the distance from the anode structure 30 to the emitter 50. For instance, with anode structure 30 being a recordable medium for a storage device, V$_a$ might be chosen to be between 500 and 1000 Volts. The lens 28 focuses the electron emission 16 by forming an electric field 34 within its aperture. By being set at a proper voltage from V$_a$, the electrons emitted from the emitter 50 are directed to the center of the aperture and then further attracted to the anode structure 30 to form the focused beam 32.

Figure 3:
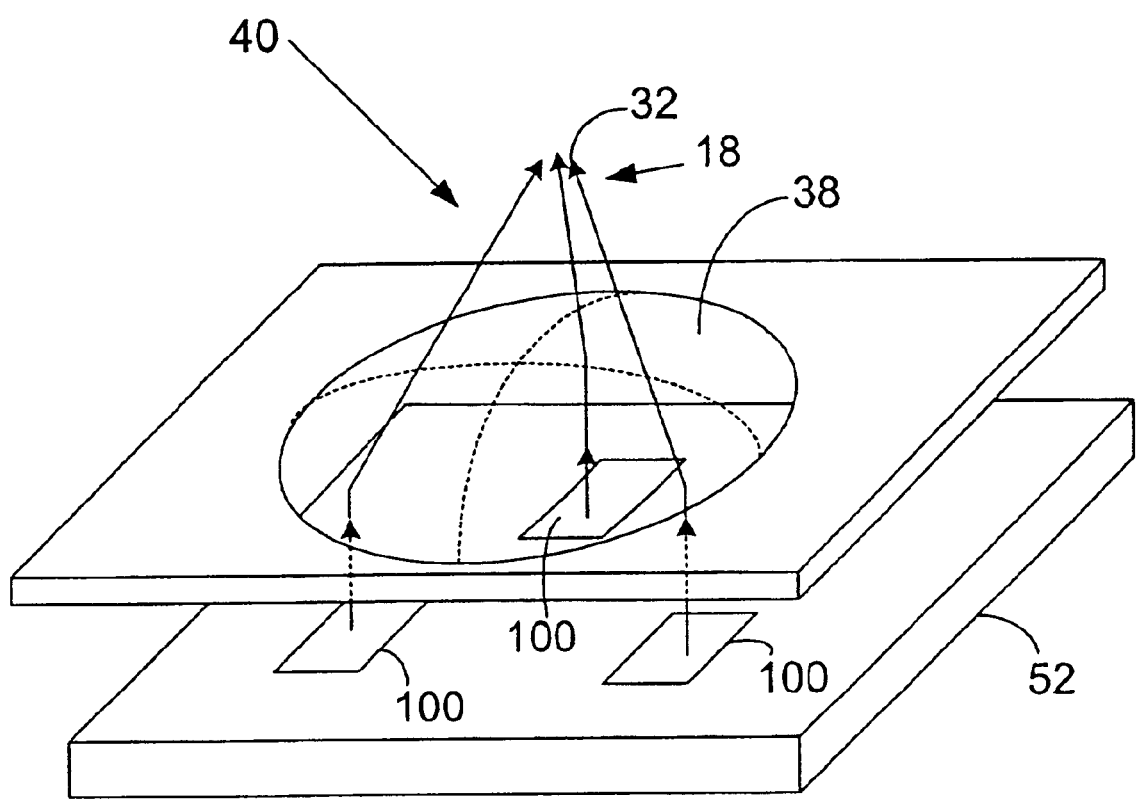
FIG. 3 is an exemplary illustration of an integrated circuit that includes several tunneling emitters and an optical lens to create a display device.

FIG. 3 is an exemplary embodiment of a display 40 having an integrated circuit 52 that includes multiple integrated emitters 100 formed in an array of pixel groups. The integrated emitters 100 emit photon emission 18, a visible light source, which is focused with an optical lens 38 to a focused beam 32 that is viewable as an image. The optical lens 38 is preferably coated with a transparent conducting surface, such as indium tin oxide, to capture electrons emitted from the emitters, thus forming a cathode layer on the lens.

Figure 4:
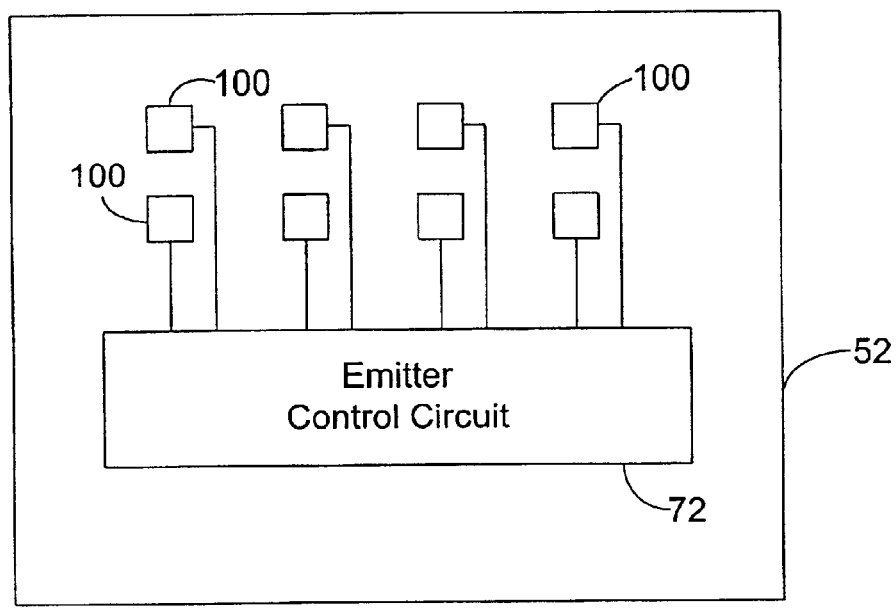
FIG. 4 is an exemplary block diagram of an integrated circuit that incorporates multiple tunneling emitters and control circuitry.

FIG. 4 is an exemplary embodiment of an integrated circuit 52 that includes at least one integrated emitter 100 but preferably a plurality of integrated emitters 100 arraigned in an array. An emitter control circuit 72 is integrated onto the integrated circuit 52 and used to operate the at least one integrated emitter 100.

Figure 5:
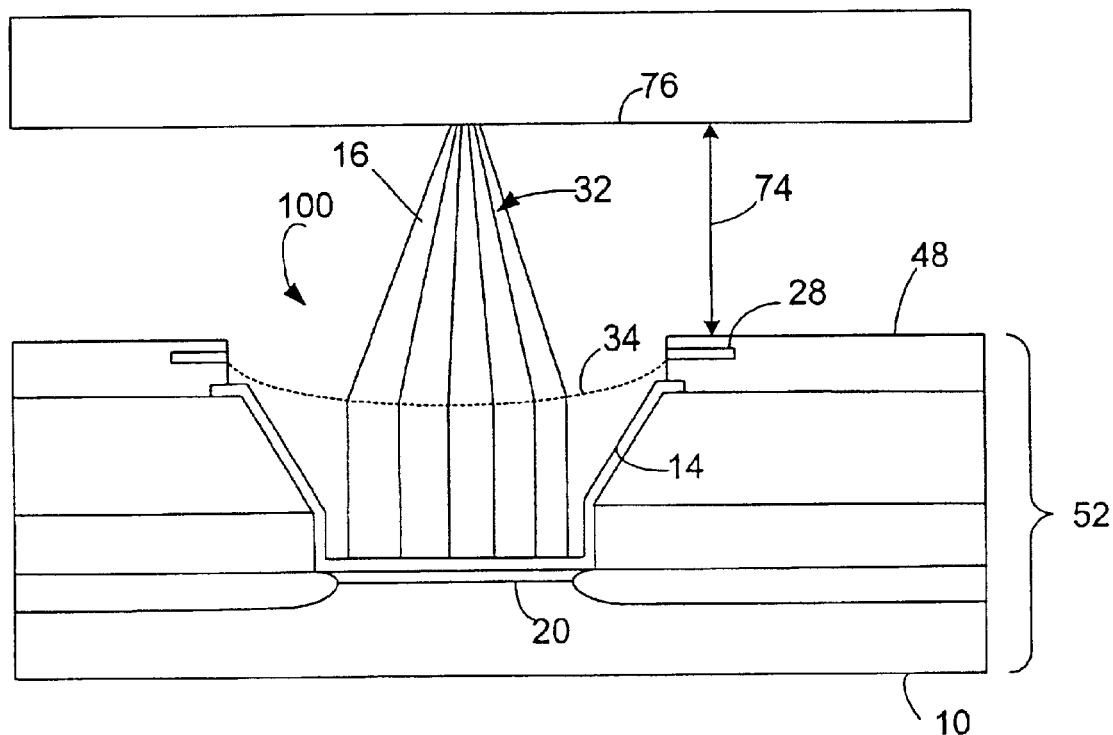
FIG. 5 is an exemplary illustration of a tunneling emitter on an integrated circuit that includes a lens for focusing the energy emissions from the tunneling emitter.

FIG. 5 is an exemplary embodiment of an integrated circuit 52 that includes an integrated emitter 100 and a lens array 48. The integrated circuit 52 is formed on a conductive substrate 10, preferably heavily doped silicon or a conductive material such as a thin film conductive layer to provide an electron source. On the substrate 10 is disposed a tunneling layer 20 having a thickness of less than 500 Angstroms, preferably about 100 Angstroms though 50 to 250 Angstroms is further preferable for some applications. Different layers of semiconductor thin-film materials are applied to the substrate 10 and etched to form the integrated emitter 100. Disposed on the tunneling layer 20 is a cathode layer 14, preferably a thin-film conductive layer of platinum, gold, molybdenum, iridium, ruthenium, tantalum, chromium, or other refractive metals or alloys thereof, but preferably substantially platinum. The cathode layer 14 forms a cathode surface from which energy in the form of electrons and photons are emitted. The lens array 48 is applied using conventional thin-film processing and includes a lens 28 defined within a conductive layer and aligned with the integrated emitter 100 to focus the energy from the integrated emitter 100 onto a surface of an anode structure 76. Anode structure 76 is located a target distance 74 from the integrated circuit 52.

Figure 6:
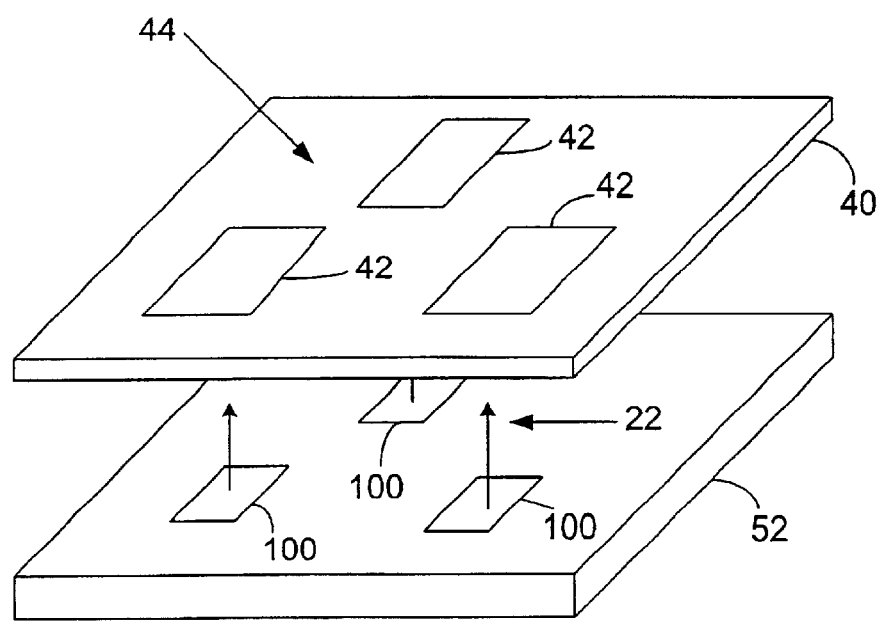
FIG. 6 is an exemplary display that is created from an integrated circuit that includes multiple tunneling emitters and an anode structure that creates or passes photons.

FIG. 6 is an alternative embodiment of a display application using the integrated emitter 100 of the invention. In this embodiment, a plurality of emitters 100 is arraigned and formed in an integrated circuit 52. Each of the emitters 100 emits energy emission 22 in the form of electron emissions 16 or photon emissions 18 (see FIG. 1). An anode structure, display 40, receives the emitted energy in display pixel 44, made up of display sub-pixels 42. Display sub-pixel 42 is preferably a phosphor material that creates photons when struck by the electron emission 16 of energy emission 22. Alternatively, display sub-pixel 42 can be a translucent opening to allow photon emission 18 of energy emission 22 to pass through the display 40 for direct photon viewing.

Figure 7:
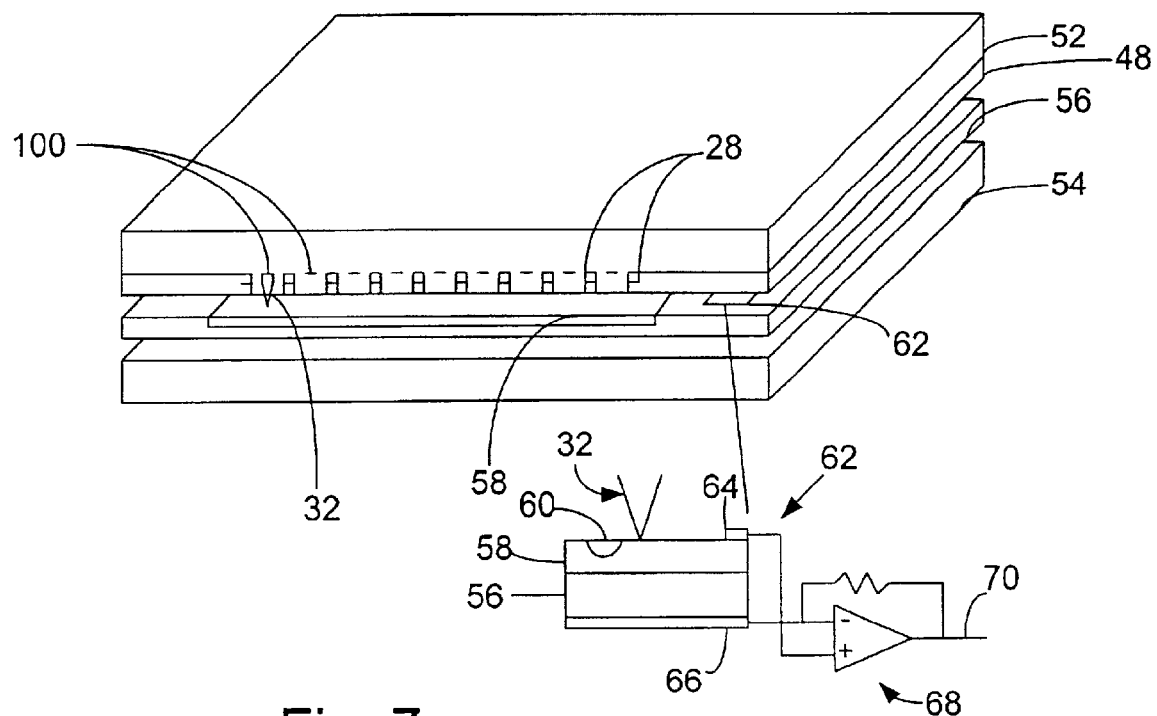
FIG. 7 is an exemplary storage device that incorporates an integrated circuit that includes multiple tunneling emitters for reading and recording information onto a rewriteable media.

FIG. 7 is an alternative use of an integrated emitter 100 within in a storage device. In this exemplary embodiment, an integrated circuit (IC) 52 having a plurality of integrated emitters 100 has a lens array 48 of focusing mechanisms aligned with integrated emitters 100. The lens array 48 is used to create a focused beam 32 that is used to affect a recording surface, media 58. Media 58 is applied to a mover 56 that positions the media 58 with respect to the integrated emitters 100 on IC 52. Preferably, the mover 56 has a reader circuit 62 integrated within. The reader 62 is shown as an amplifier 68 making a first ohmic contact 64 to media 58 and a second ohmic contact 66 to mover 56, preferably a semiconductor or conductor substrate. When a focused beam 32 strikes the media 58, if the current density of the focused beam is high enough, the media is phase-changed to create an effected media area 60. When a low current density focused beam 32 is applied to the media 58 surface, different rates of current flow are detected by amplifier 68 to create reader output 70. Thus, by affecting the media with the energy from the emitter 50, information is stored in the media using structural phase changed properties of the media. One such phase-change material is $In_2Se_3$. Other phase change materials are known to those skilled in the art.

Figure 8:
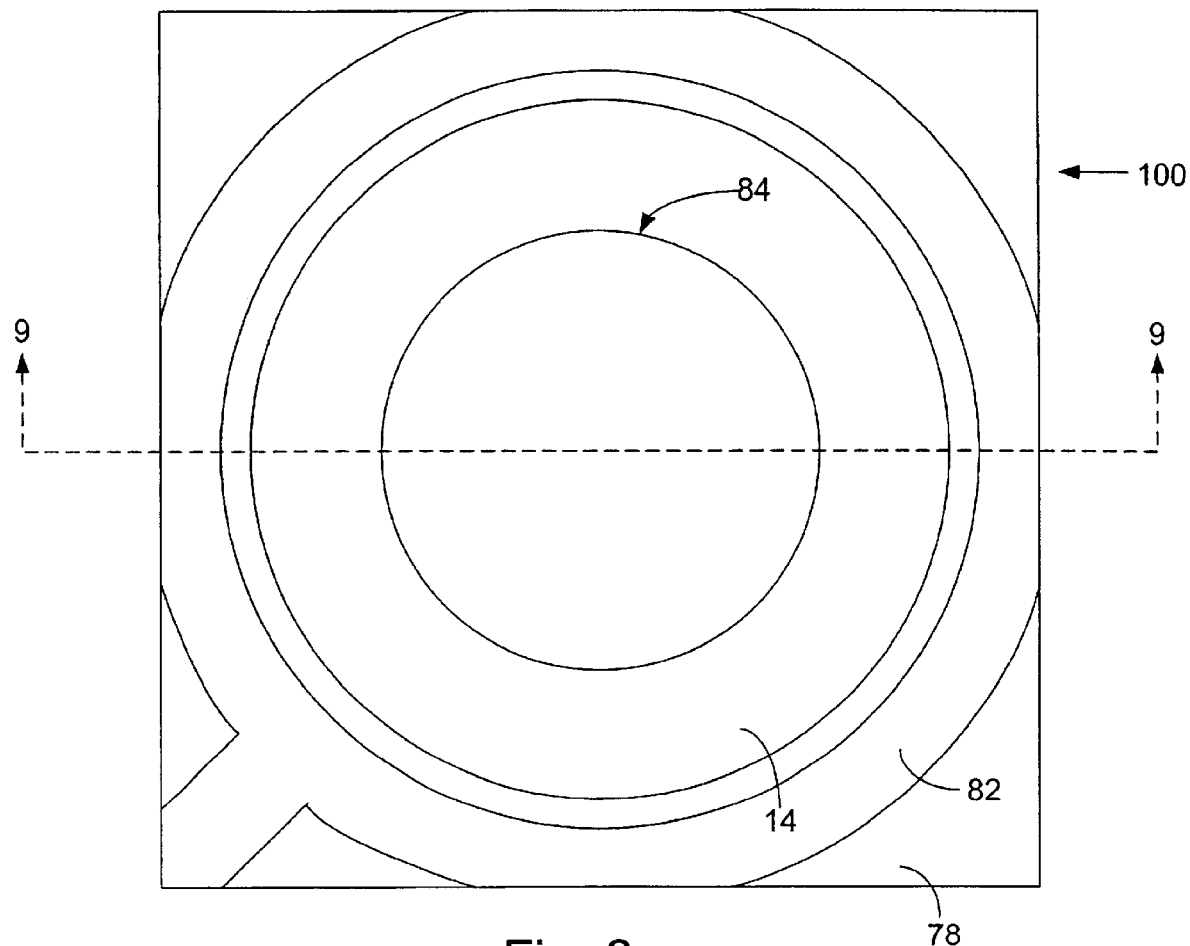
FIG. 8 is a top view of an exemplary tunneling emitter.

FIG. 8 is a top view of an exemplary embodiment of the invention of an integrated emitter 100 that includes an emitter area 84 within the cathode layer 14. The cathode layer 14 is electrically coupled to and disposed on conductive layer 82 that is disposed over insulator layer 78. Integrated emitter 100 is shown as preferably a circular shape, however other shapes can be used. The circular shape is preferable in that the electric fields generated are more uniform as there are no discrete edges within the shape.

Figure 9:
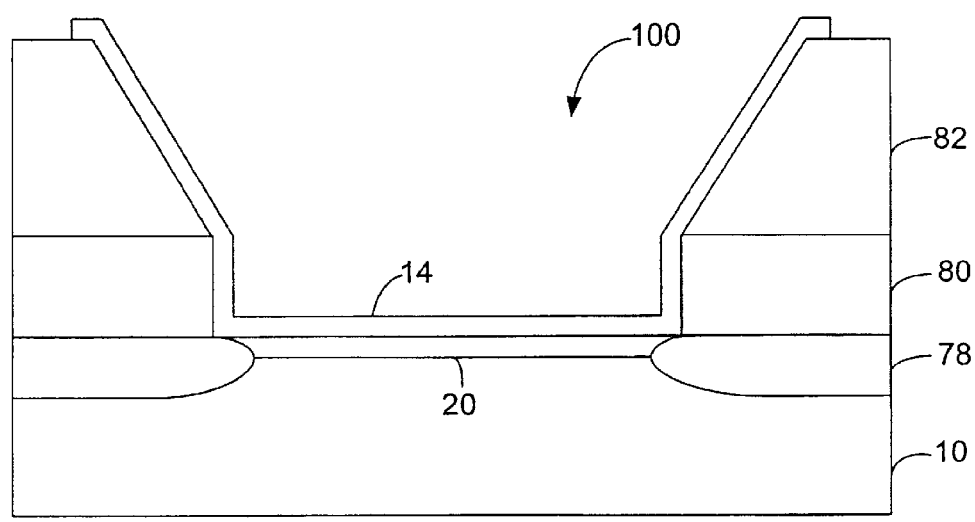
FIG. 9 is an exemplary cross-sectional view of the tunneling emitter shown in FIG. 8.

FIG. 9 is a cross-section of the exemplary embodiment of integrated emitter 100 shown in FIG. 8 looking into the 9—9 axis. A substrate 10, preferably a conductive layer or a highly doped semiconductor provides an electron supply to tunneling layer 20 that is disposed within an opening defined within an insulator layer 78. A cathode layer 14, preferably a thin-film conductive layer is disposed over the tunneling layer 20 and partially over the conductive layer 82 thereby making electrical contact with the conductive layer. Optionally, an adhesion layer 80 can be added to provide for a bonding interface between the conductive layer 82 and the insulator layer 78 depending on the particular materials chosen for insulator layer 78 and conductive layer 82.

Figure 10:
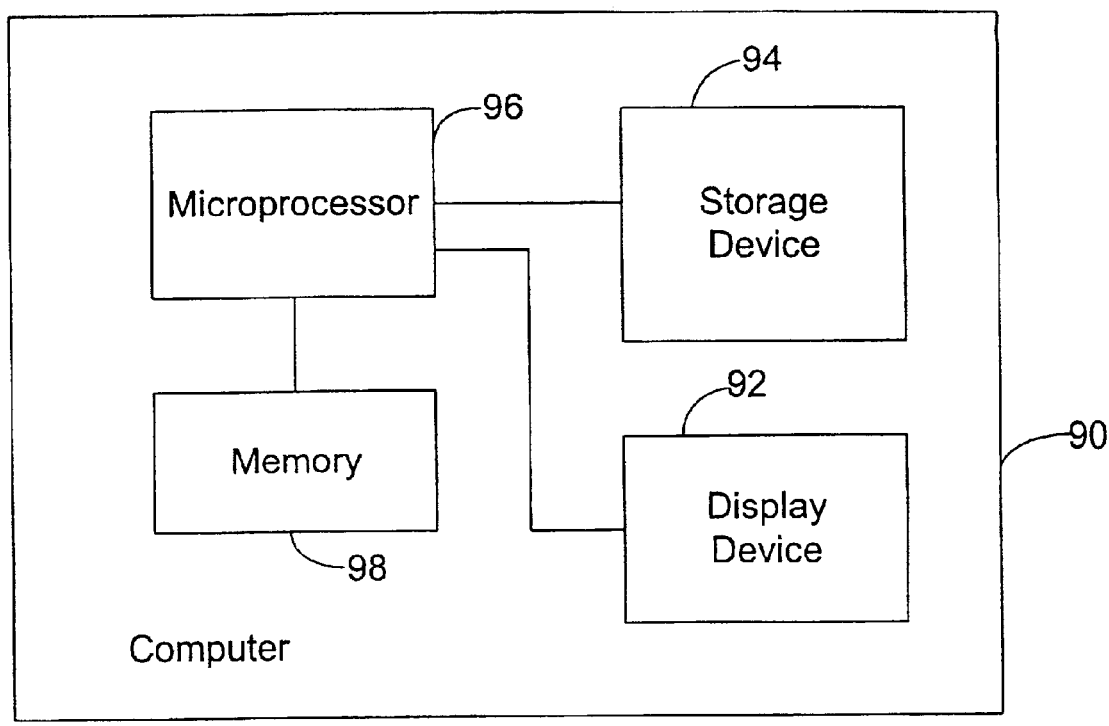
FIG. 10 is an exemplary block diagram of a computer that incorporates at least one of the electronic devices, a display or storage device, which incorporate the tunneling emitters of the invention.

FIG. 10 is an exemplary block diagram of a computer 90 that includes a microprocessor 96, memory 98, which is coupled to the microprocessor 96, and electronic devices, a storage device 94 and a display device 92. The electronic devices are coupled to the microprocessor 96. The microprocessor 96 is capable of executing instructions from the memory to allow for the transfer of data between the memory and the electronic devices, such as the storage device 94 and the display device 92. Each electronic device includes an integrated circuit that has an emitter incorporating the invention and preferably a focusing device for focusing the emissions from the emitter. The emitter has an electron supply layer with an insulating layer disposed thereon. The insulating layer has an opening defined within which a tunneling layer is formed on the electron supply layer. On the tunneling layer is a cathode layer. Preferably but optionally, the integrated circuit with the emitter has been subjected to an annealing process thereby increasing the supply of electrons that can tunnel from the electron supply layer to the cathode layer. The annealing process also reduces the contact resistance between metal layers thereby enhancing conductivity of electrons to the emitter.

Figure 11A:
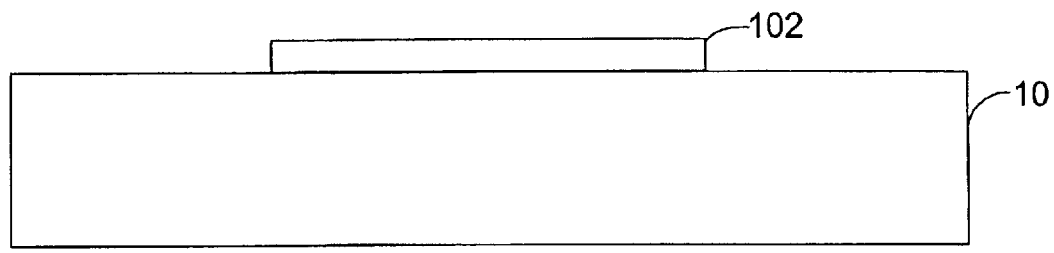
FIGS. 11A–11L are illustrations of exemplary steps used in an exemplary process to create the tunneling emitter of the invention.

FIGS. 11A to 11L illustrate exemplary process steps used to create an emitter incorporating the invention. In FIG. 11A, a mask 102, of dielectrics or photoresist is applied to a substrate 10, preferably a silicon semiconductor substrate, although substrate 10 might be a conductive thin-film layer or a conductive substrate. Preferably substrate 10 has a sheet resistance of about 100 to 0.0001 ohms centimeter.

Figure 11B:
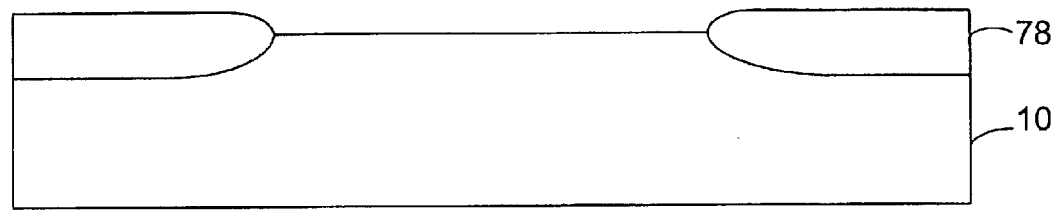

In FIG. 11B an insulator layer 78 is created, preferably by field oxide growth when substrate 10 is a silicon substrate. Optionally, the insulator layer 78 can be formed of other oxide, nitride, or other conventional dielectrics deposited or grown alone or in combination using conventional semiconductor processes. The insulator layer 78 is created on substrate except in areas covered by mask 102. The area defined by mask 102, and thus the resulting voids or defined openings within insulator layer 78 determines the location and shape of the latter formed integrated emitter 100 when mask 102 is removed.

Figure 11C:
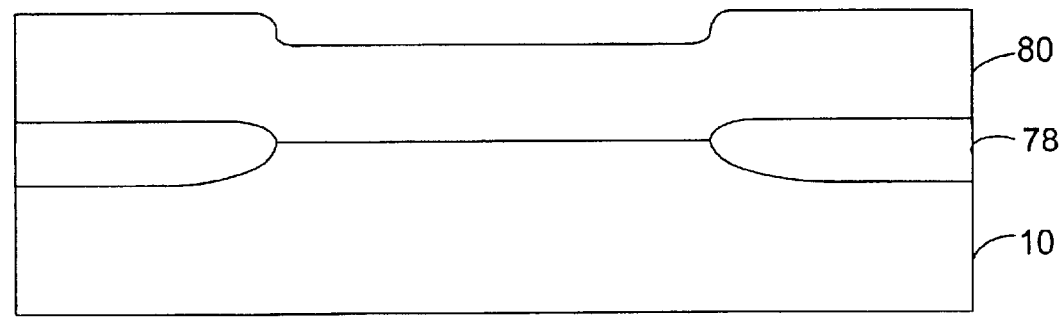

In FIG. 11C, an optional adhesive layer 80 is applied on the substrate 10 and insulator layer 78. The adhesive layer 80 is preferably tantalum when the later applied conductive layer 82 (see FIG. 11D) is made of gold. Preferably, the adhesive layer is applied using conventional deposition techniques. The adhesive layer is preferably about 100 to about 200 Angstroms thick but can be any thickness depending on the materials chosen.

Figure 11D:
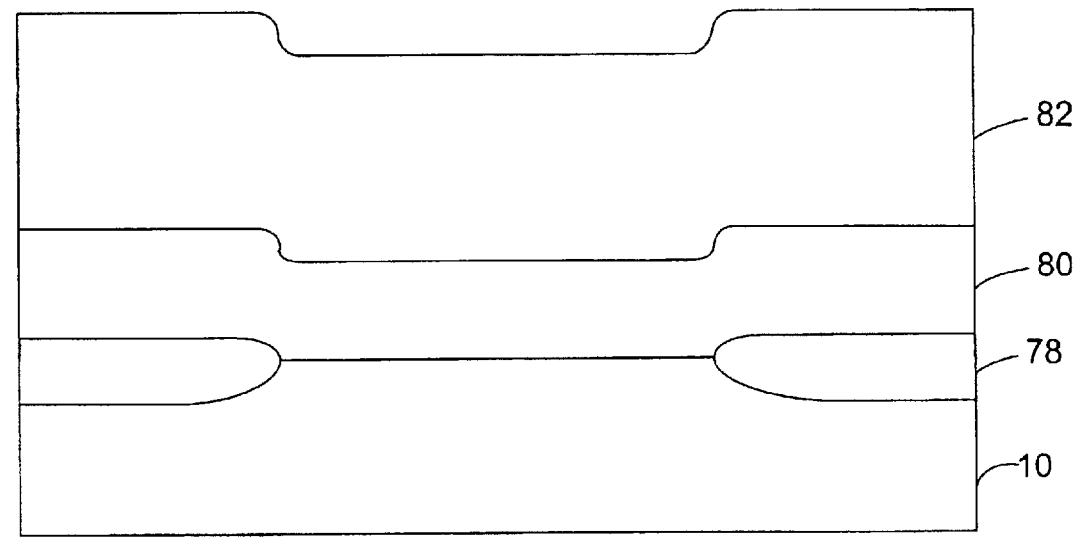

In FIG. 11D a conductive layer 82 is applied on the previously applied layers on substrate 10, such as adhesive layer 80 if used. Preferably, the conductive layer is formed using conventional deposition techniques. The conductive layer is preferably gold that is about 500 to about 1000 Angstroms thick.

Figure 11E:
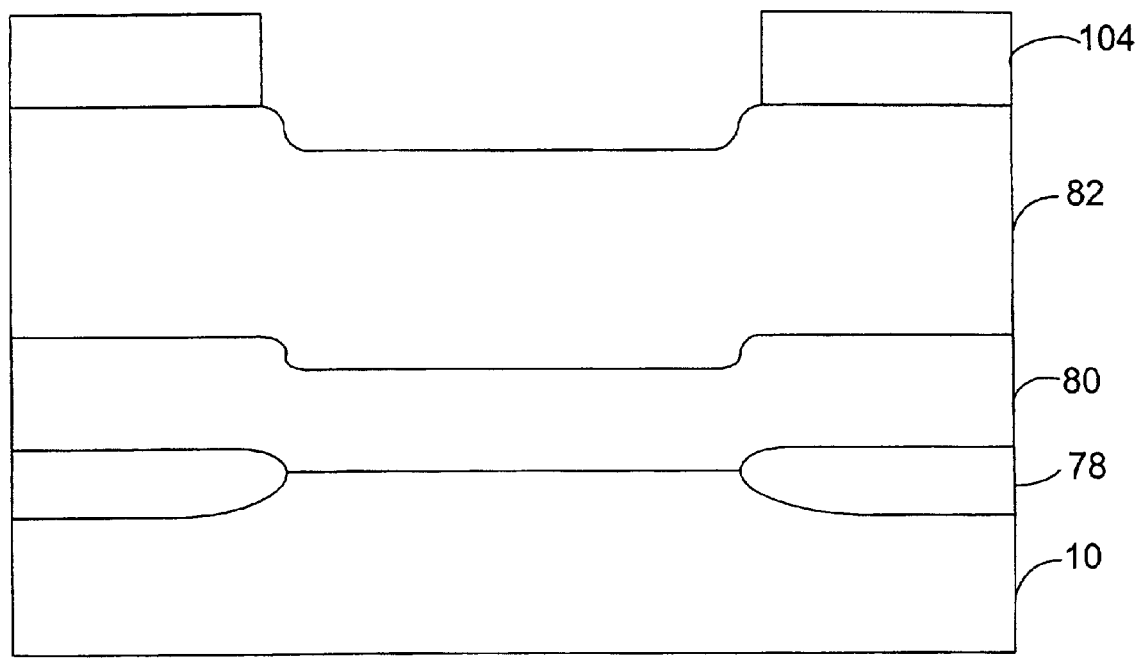

In FIG. 11E a patterning layer 104 is applied on the conductive layer 82 and an opening is formed within it to define an etching region for creating the integrated emitter. Preferably, the patterning layer 104 is a positive photoresist layer of about 1 um thickness.

Figure 11F:
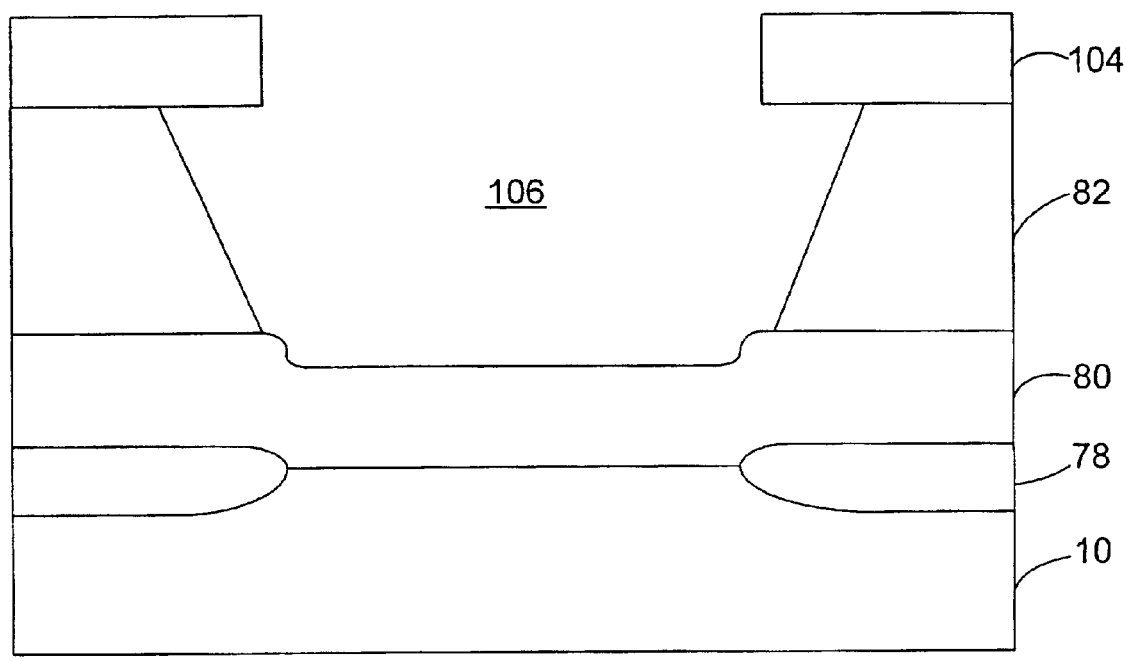

In FIG. 11F preferably a wet etch process is used to create an opening in the conductive layer 82 within the opening of the patterning layer 104. Typically, the etching will create an isotropic etch profile 106 as shown in which a portion of the conductive layer is undercut under the patterning layer 104. Preferably the wet etch process used does not react with the adhesive layer 80, if used, to prevent the etch material from reaching the substrate 10. Optionally, a dry etch process can be used to etch the conductive layer 82.

Figure 11G:
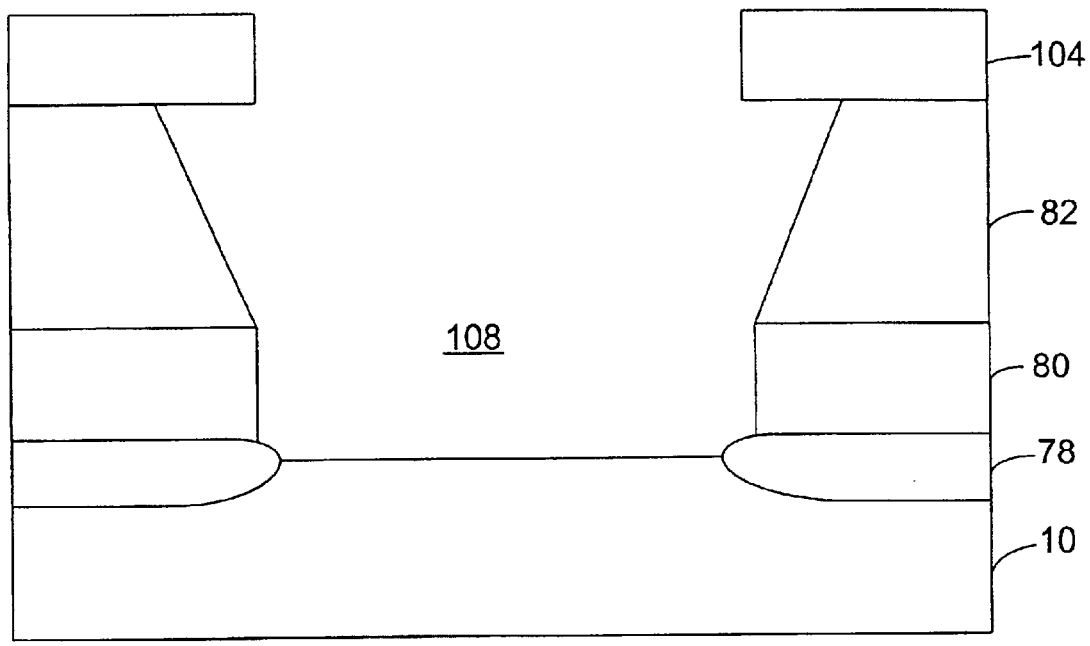

In FIG. 11G preferably a dry etch process that is reactive to the adhesive layer 80 is used to create an anisotropic profile 108.

Figure 11H:
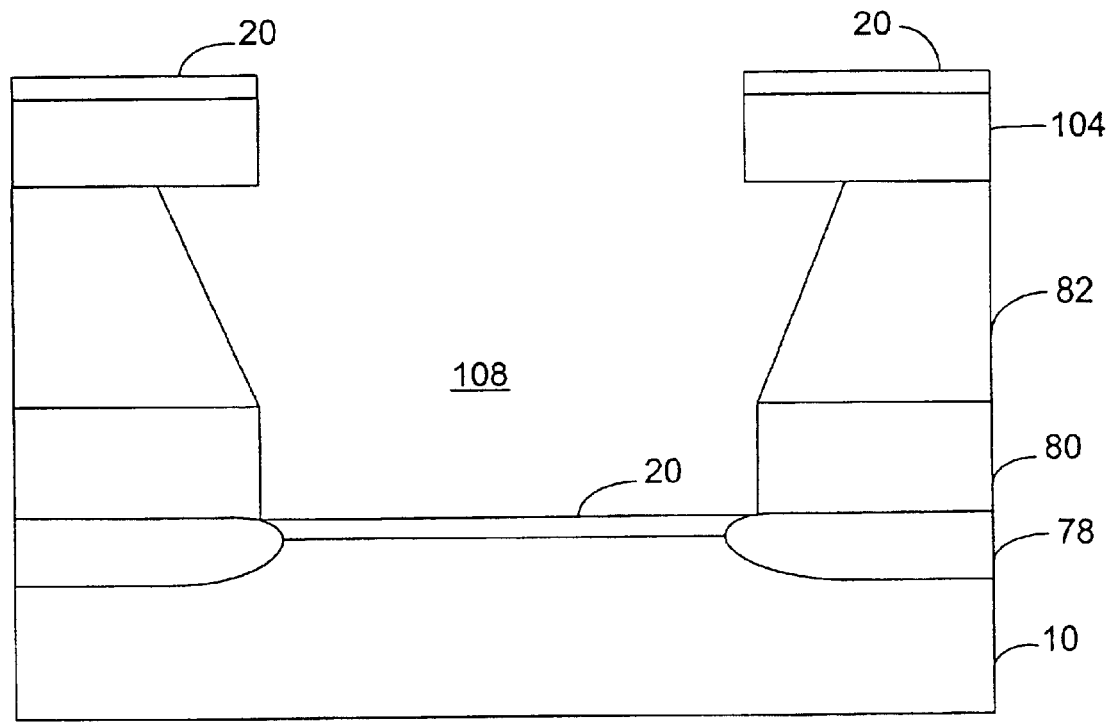

In FIG. 11H a tunneling layer 20 of preferably a high dielectric strength material such as metal cluster dielectrics, $TiO_x$, $TaO_x$, WSiN, $TaAlO_xN_y$, $TaAlO_x$, or $AlO_xN_y$, but preferably $TiO_x$, is applied over the surface of the processed substrate 10 on the patterning layer 104 and openings in insulator layer 78. The tunneling layer 20 is preferably deposited by sputtering the metal and introducing oxygen and/or nitrogen to form the dielectric to a thickness of less than about 500 Angstroms, preferably between about 50 to about 250 Angstroms, such as about 100 Angstroms.

Figure 11I:
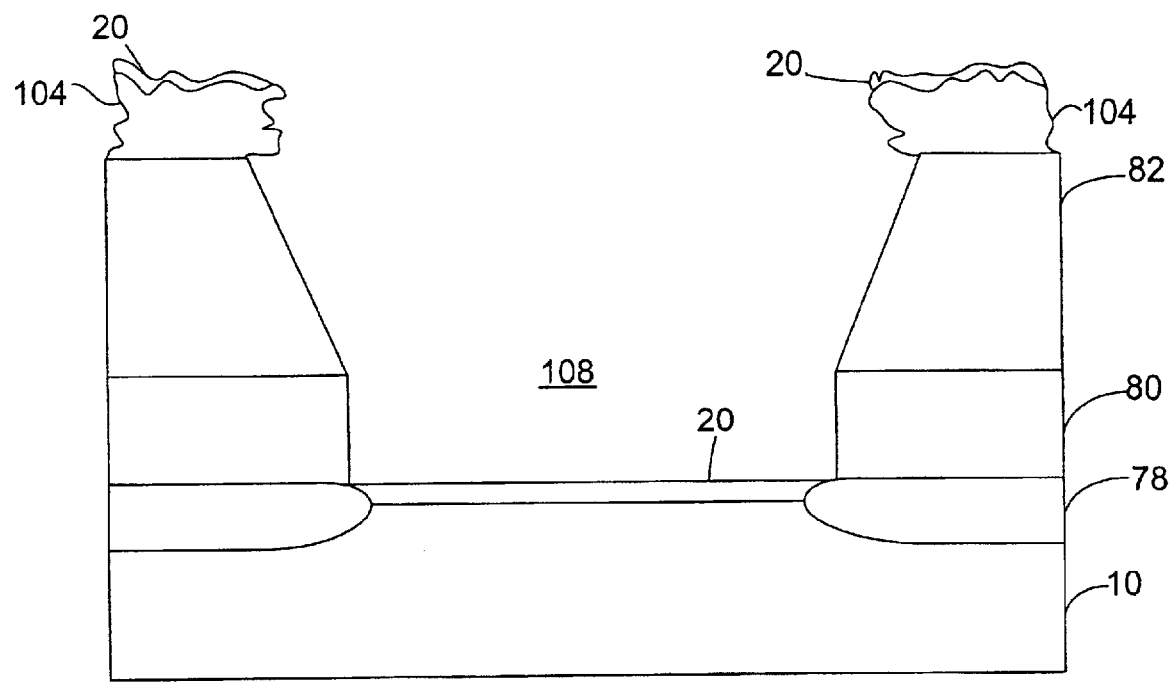

In FIG. 11I a lift-off process is used to remove patterning layer 104 and that portion of tunneling layer 20 that is disposed on the patterning layer 104. Preferably, low temperature plasma is used to reactively etch ash organic materials within the patterning layer 104. The gas used is preferably oxygen in a planer plasma etch process. The processed substrate 10 is place in a chamber and the oxygen is introduced and excited by an energy source to create a plasma field. The plasma field energizes the oxygen to a high-energy state, which, in turn oxidizes the patterning layer 104 components to gases that are removed from the chamber by a vacuum pump. Because of their proximity and difference in volume ratios, some of the components of the patterning layer 104 during lift-off react with constituents in the thin tunneling layer 20 disposed on the patterning layer 104. For example, carbon monoxide released from the patterning layer 104 reacts with the oxygen in a $TiO_x$ layer of tunneling layer 20 to form $CO_2$ gas which is then removed leaving a small amount of Ti on the surface of the conductive layer 82. Thus the tunneling layer 20 disposed on the patterning layer 104 is essentially removed in the lift-off process. After the lift-off process is complete, essentially only that portion of tunneling layer 20 that is disposed within the openings of insulator layer 78 remains.

Optionally, a wet lift-off process can be used in lieu of the plasma lift-off process. After the tunneling layer 20 is applied to the surface of the processed substrate 10, the substrate 10 is immersed in a solvent that will swell and remove the patterning layer 104 thus keeping the tunneling layer 20 disposed within the opening of insulator layer 78.

Figure 11J:
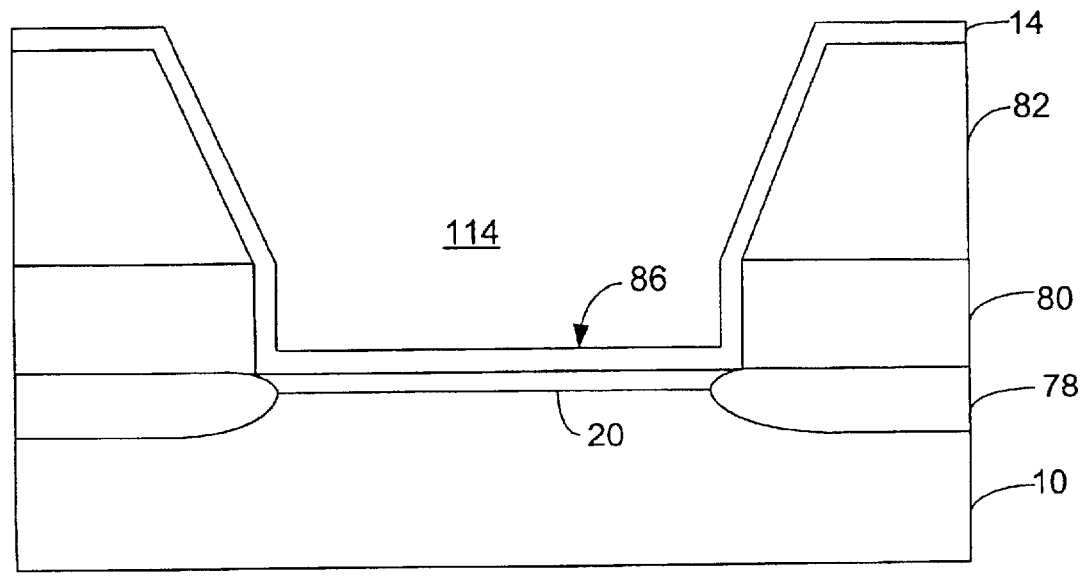

FIG. 11J shows the application of a cathode layer 14 over the surface of the processed substrate 10. The cathode layer 14 is preferably a thin-film metallic layer such as platinum and preferably has a thickness of about 50 to about 250 Angstroms. Other metals can be used for cathode layer 14 such as gold, molybdenum, iridium, ruthenium, tantalum, chromium, or other refractive metals or alloys thereof. The cathode layer 14 disposed on tunneling layer 20 forms the emitter surface 86 within the emitter chamber 114.

Figure 11K:
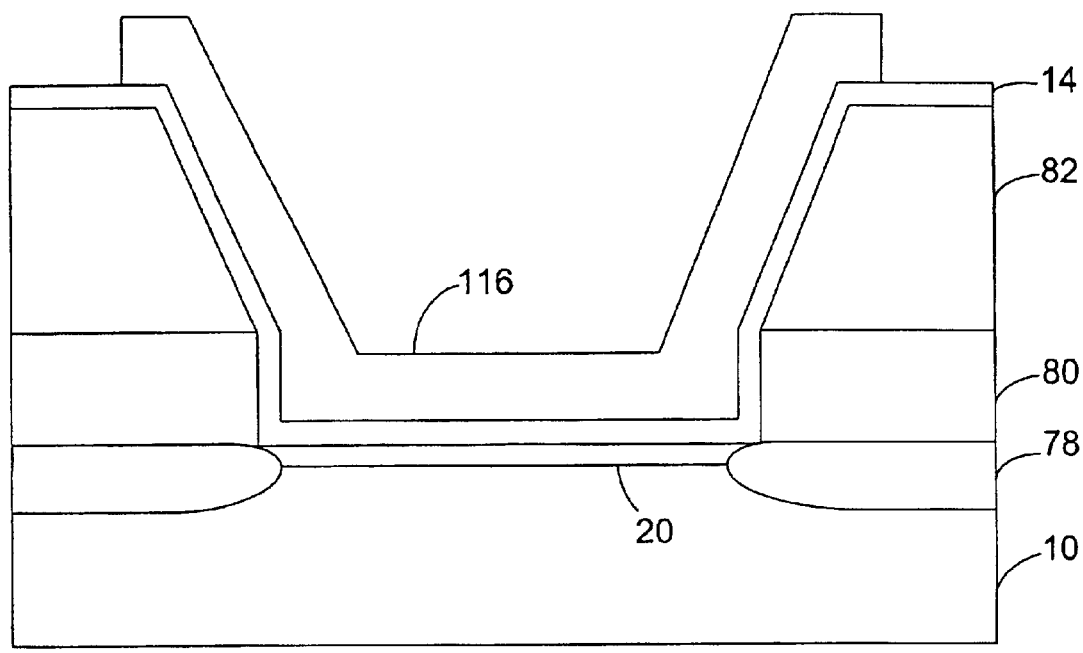

FIG. 11K illustrates the application of a cathode photoresist layer 116 that has been applied and patterned to define openings where the cathode layer 14 is to be etched to isolate multiple emitters on the substrate 10.

Figure 11L:
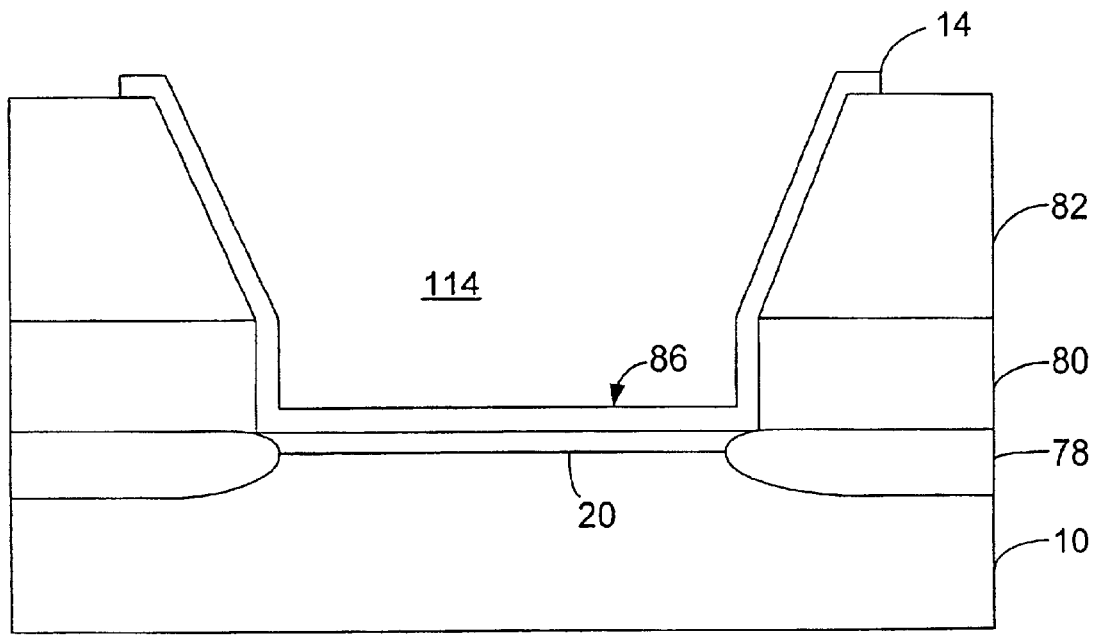

FIG. 11L illustrates the cathode layer 14 after it has been etched and the cathode photoresist 116 removed. Within the emitter chamber 114 is the emitter surface 86. An exemplary top view of the resulting structure is shown in FIG. 8. The emitter surface 86 has a first area. The emitter chamber 114 has a first chamber section interfacing to the emitter surface 86 that has substantially parallel sidewalls within the adhesion layer 80. The emitter chamber 114 has a second chamber section formed in the conductive layer 82 that has sidewalls that diverge to an opening having a second area. The second area is larger than the first area. The cathode layer 14 is disposed on the emitter surface 86 and the sidewalls of the first and second sections of the emitter chamber 114. By using integrated circuit thin film technology to fabricate the emitter, it can be integrated along with traditional active circuits found on conventional integrated circuits. The integrated circuit with the emitter can be used in display devices or storage devices as previously described. Preferably, after fabrication, the emitter is subjected to an annealing process to increase the amount of emission from the emitter.

Figure 12A:
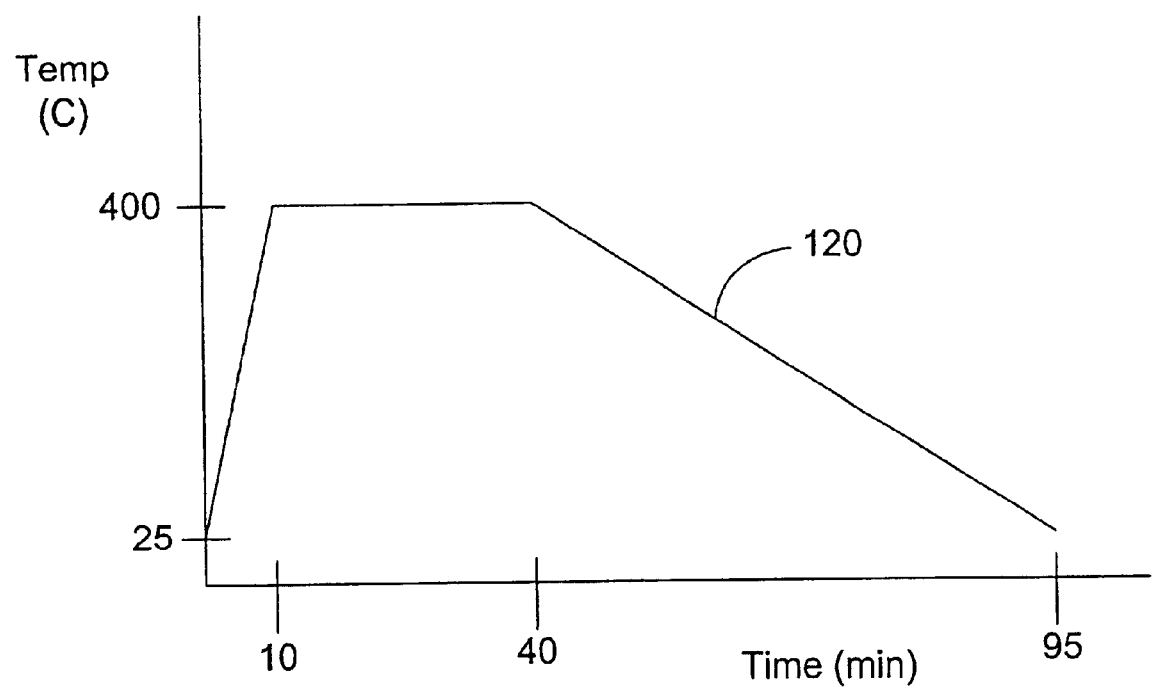
FIGS. 12A and 12B are charts of exemplary annealing processes used to optionally improve the tunneling emitters of the invention.
Figure 12B:
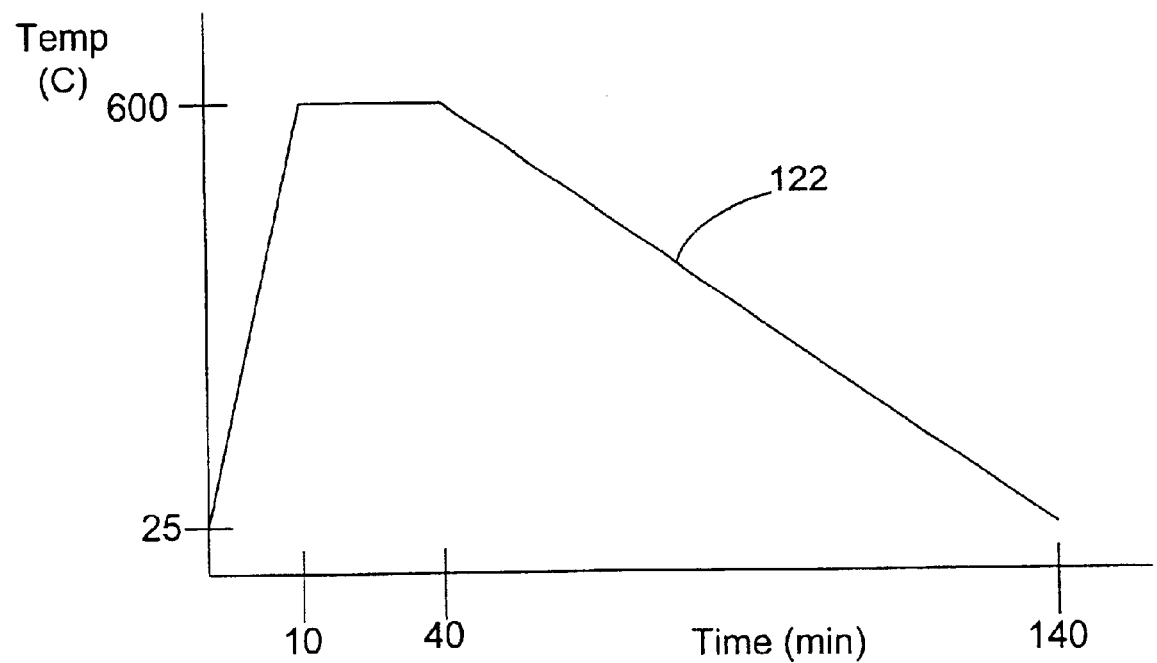

FIGS. 12A and 12B are charts of exemplary annealing processes which are used to increase the emission current capability of an emitter embodying the invention. The annealing process also increases the device yields and quality by allowing the emitters to last longer. The annealing process, among other benefits, helps to decrease the resistance of contacts of dissimilar metals thereby increasing the current flow to the emitters.

In FIG. 12A, a first thermal profile 120 shows the processed substrate that includes an emitter incorporating the invention first elevated to a temperature of about 400 C. within 10 minutes then held at this temperature for 30 minutes. Then the processed substrate is slowly cooled back to room temperature (about 25 C.) over a period of about 55 minutes.

In FIG. 12B, a second thermal profile 122 shows the processed substrate including an emitter incorporating the invention heated to a temperature of about 600 C. within 10 minutes and held at that temperature for about 30 minutes. Then, the processed substrate is gradually cooled to room temperature over a period of about 100 minutes. Those skilled in the art will appreciate that the elevated temperature and the rate of cooling can be modified from the exemplary processes described and still meet the spirit and scope of the invention. By annealing the substrate that includes at least one emitter incorporating the invention, several characteristics of the emitter are improved.

What is claimed is:

1. An emitter, comprising:
   an electron supply;
   a cathode layer; and
   a tunneling layer disposed between the electron supply and the cathode layer wherein the electron supply, cathode layer, and tunneling layer have been subjected to an annealing process.

2. The emitter of claim 1 wherein the tunneling layer is a metal cluster dielectric.

3. The emitter of claim 1 wherein the tunneling layer is a metal cluster dielectric selected from the group consisting of $TiO_x$, $TaO_x$, WSiN, $TaAlO_xN_y$, $TaAlO_x$ and $AlO_xN_y$.

4. The emitter of claim 1 wherein the cathode layer is selected from the group consisting of platinum, gold, molybdenum, tantalum, iridium, ruthenium, chromium, and alloys thereof.

5. The emitter of claim 1 operable to provide an emission current of greater than $1\times10^{-2}$ Amps per square centimeter.

6. The emitter of claim 1 operable to provide an emission current of greater than $1\times1^{-1}$ Amps per square centimeter.

7. The emitter of claim 1 operable to provide an emission current of greater than $1\times10^0$ Amps per square centimeter.

8. The emitter of claim 1 wherein the tunneling layer has a thickness less than about 500 Angstroms.

9. The emitter of claim 1 wherein the tunneling layer has a thickness less than about 250 Angstroms.

10. The emitter of claim 1 wherein the tunneling layer has a thickness less than about 100 Angstroms.

11. The emitter of claim 1 wherein the tunneling layer has a thickness of about 50 Angstroms.

12. The emitter of claim 1 wherein the tunneling layer has a thickness within the range of about 50 to about 250 Angstroms.

13. An integrated circuit, comprising:
    a substrate;
    the emitter of claim 1 disposed on the substrate; and
    circuitry for operating the emitter formed on the substrate with the emitter.

14. An electronic device, comprising:
    the emitter of claim 1 capable of emitting energy; and
    an anode structure capable of receiving the emitted energy and generating at least a first effect in response to receiving the emitted energy and a second effect in response to not receiving the emitted energy.

15. The electronic device of claim 14 wherein the electronic device is a mass storage device and the anode structure is a storage medium, the electronic device further comprising a reading circuit for detecting the effect generated on the anode structure.

16. The electronic device of claim 14 wherein the electronic device is a display device and the anode structure is a display screen that creates a visible effect in response to receiving the emitted energy.

17. The electronic device of claim 16 wherein the display screen includes one or more phosphors operable for emitting photons in response to receiving the emitted energy.

18. An emitter, comprising:

an electron supply layer;

an insulator layer formed on the electron supply layer and having an opening defined within;

a tunneling layer formed on the electron supply layer in the opening; and a cathode layer formed on the tunneling layer;

wherein the emitter has been subjected to an annealing process to increase the supply of electrons tunneled from the electron supply layer to the cathode layer for energy emission.

19. The emitter of claim 18 capable of emitting photons in addition to the electron emission.

20. The emitter of claim 18 wherein the tunneling layer is a metal cluster dielectric.

21. The emitter of claim 18 wherein the cathode layer has an emission rate greater than about 0.01 Amps per square centimeter.

22. The emitter of claim 18 wherein the tunneling layer is a metal cluster dielectric selected from the group consisting of $TiO_x$, $TaO_x$, WSiN, $TaAlO_xN_y$, $TaAlO_x$ and $AlO_xN_y$.

23. The emitter of claim 18 wherein the tunneling layer has a thickness less than 500 Angstroms.

24. The emitter of claim 18 wherein the tunneling layer has a thickness between about 50 Angstroms and about 250 Angstroms.

25. A display device, comprising:

an integrated circuit including the emitter of claim 18, wherein the emitter emits a visible light source; and a lens for focusing the visible light source, wherein the lens is coated with a transparent conducting surface to capture electrons emitted from the emitter.

26. A storage device, comprising:

an integrated circuit including the emitter of claim 18 wherein the emitter creates an electron beam current; and a storage medium in close proximity to the emitter, the storage medium having a storage area being in one of a plurality of states to represent the information stored in that storage area;

such that:

an effect is generated when the electron beam current bombards the storage area;

the magnitude of the effect depends on the state of the storage area; and the information stored in the storage area is read by measuring the magnitude of the effect.

27. An electronic device, comprising:

an integrated circuit including the emitter of claim 18 and a focusing device for converging the emissions from the emitter.

28. A computer system, comprising:

a microprocessor;

the electronic device of claim 27 coupled to the microprocessor; and memory coupled to the microprocessor, the microprocessor operable of executing instructions from the memory to transfer data between the memory and the electronic device.

29. The computer system of claim 28 wherein the electronic device is a storage device.

30. The computer system of claim 28 wherein the electronic device is a display device.

31. An emitter, comprising:

an electron supply surface;

an insulator layer formed on the electron supply surface and having a first opening defined within;

an adhesion layer disposed on the insulator layer, the adhesion layer defining a second opening aligned with the first opening;

a conductive layer disposed on adhesion layer and defining a third opening aligned with the first and second openings;

a tunneling layer formed on the electron supply layer within the first, second, and third openings; and a cathode layer disposed on the tunneling layer and portions of the conductive layer, wherein the portion of the cathode layer on the tunneling layer is an electron-emitting surface wherein the emitter has been subjected to an annealing process.

32. The emitter of claim 31 wherein the electron emitting surface has an emission rate of about 0.1 to about 1.0 Amps per square centimeter.

33. The emitter of claim 31, wherein the tunneling layer is a metal cluster dielectric film from the group consisting of $TaO_x$, WSiN, $TiO_x$, $TaAlO_xN_y$, $TaAlO_x$, and $AlO_xN_y$.

34. The emitter of claim 31 wherein the tunneling layer has a thickness between about 50 Angstroms to about 250 Angstroms.

35. The emitter of claim 31, wherein the tunneling layer has a thickness of about 100 Angstroms.

36. The emitter of claim 31, wherein the tunneling layer has a thickness less than about 500 Angstroms.

37. The emitter of claim 31 wherein the electron-emitting surface also emits photon energy.

* * * * *

UNITED STATES PATENT AND TRADEMARK OFFICE
CERTIFICATE OF CORRECTION

PATENT NO. : 6,781,146 B2
DATED : August 24, 2004
INVENTOR(S) : Chen et al.

It is certified that error appears in the above-identified patent and that said Letters Patent is hereby corrected as shown below:

Column 8,
Line 37, delete "$1 \times 1^{-1}$" and insert therefor -- $1 \times 10^{-1}$ --.

Column 10,
Line 4, delete "18" and insert therefor -- 18; --.

Signed and Sealed this

Twenty-ninth Day of March, 2005

JON W. DUDAS
*Director of the United States Patent and Trademark Office*